(12) United States Patent
Sugiura et al.

(10) Patent No.: US 8,135,521 B2
(45) Date of Patent: Mar. 13, 2012

(54) CONTROL DEVICE FOR AUTOMATIC TRANSMISSION

(75) Inventors: Tadashi Sugiura, Anjo (JP); Yosuke Takei, Anjo (JP); Hideaki Ogasawara, Anjo (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 669 days.

(21) Appl. No.: 12/314,819

(22) Filed: Dec. 17, 2008

(65) Prior Publication Data
US 2009/0171540 A1 Jul. 2, 2009

(30) Foreign Application Priority Data

Dec. 27, 2007 (JP) ................................ 2007-338147

(51) Int. Cl.
*B60W 10/10* (2006.01)
(52) U.S. Cl. ................ 701/52; 701/55; 701/60; 701/66
(58) Field of Classification Search .................. 701/34, 701/51, 53, 52, 54, 55, 60, 61, 65, 66
See application file for complete search history.

(56) References Cited

U.S. PATENT DOCUMENTS

| | | | |
|---|---|---|---|
| 4,638,690 A | 1/1987 | Hattori et al. | |
| 4,905,530 A | 3/1990 | Stehle et al. | |
| 4,987,792 A | 1/1991 | Mueller et al. | |
| 5,044,220 A | 9/1991 | Raff et al. | |
| 5,062,314 A | 11/1991 | Maier et al. | |
| 5,070,740 A | 12/1991 | Giek et al. | |
| 5,916,292 A * | 6/1999 | Issa et al. ........................ 701/62 |
| 6,536,299 B2 * | 3/2003 | Kim ........................... 74/473.18 |
| 2003/0232680 A1 | 12/2003 | Matsunaga et al. | |
| 2006/0014610 A1 | 1/2006 | Matsunaga et al. | |

FOREIGN PATENT DOCUMENTS

| | | |
|---|---|---|
| EP | 0 108 572 A1 | 5/1984 |
| JP | A-6-241301 | 8/1994 |
| JP | A-8-159277 | 6/1996 |
| JP | A-10-324169 | 12/1998 |
| JP | A 2005-351482 | 12/2005 |
| JP | A-2006-38041 | 2/2006 |

* cited by examiner

*Primary Examiner* — Richard M. Camby
(74) *Attorney, Agent, or Firm* — Oliff & Berridge, PLC

(57) ABSTRACT

A control device for an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the control device includes a manual shift control unit that changes and sets the gear ratio after downshift depending on a degree of requirement for deceleration based on a driving operation when the downshift command has been operated by the manual operation device in the manual shift mode, and performs the downshift to the gear ratio that has been changed and set.

18 Claims, 13 Drawing Sheets

F I G . 2
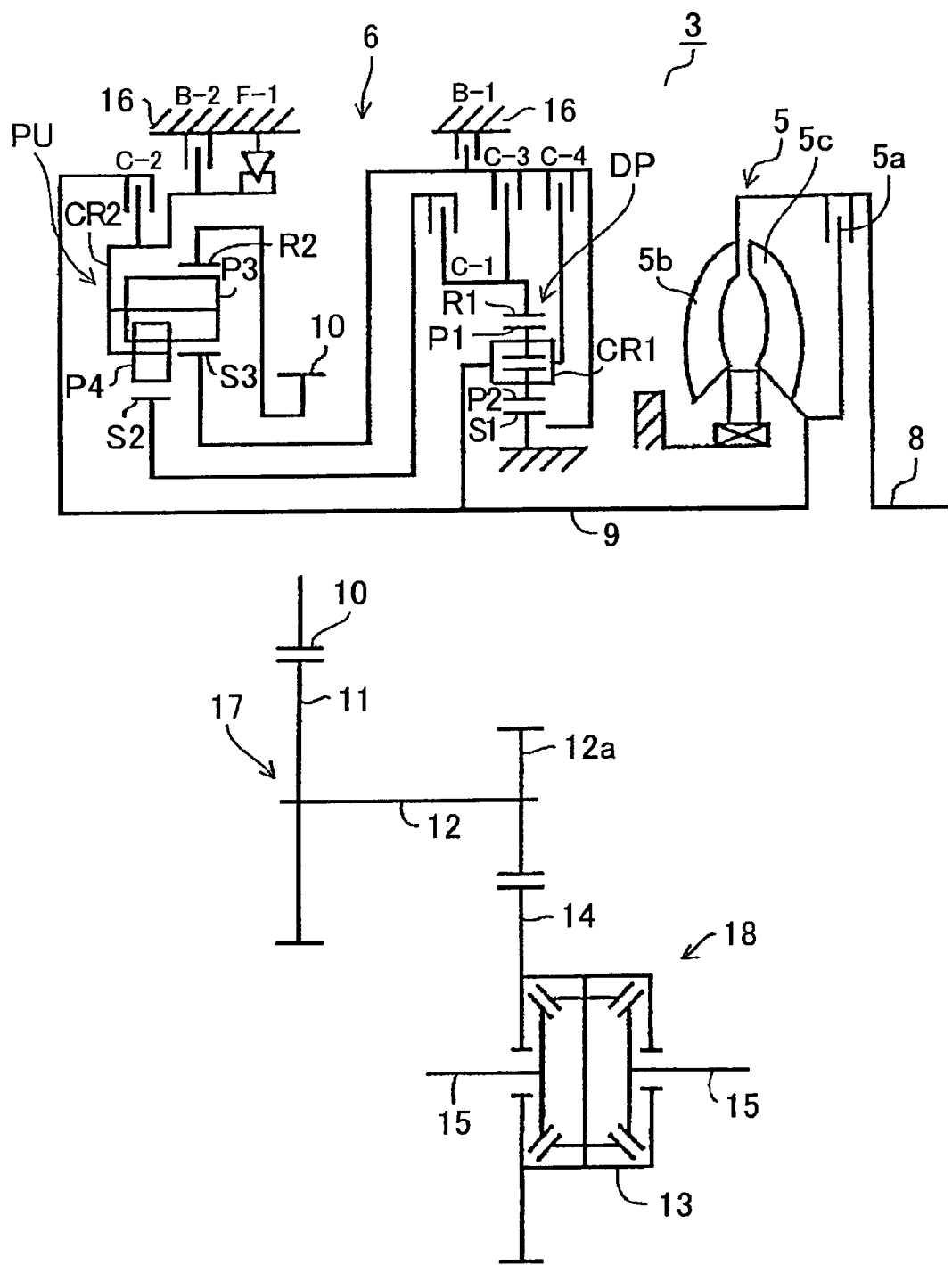

FIG.3

|      | C-1 | C-2 | C-3 | C-4 | B-1 | B-2 | F-1 |
|------|-----|-----|-----|-----|-----|-----|-----|
| 1st  | ●   |     |     |     |     | (●) | ●   |
| 2nd  | ●   |     |     |     | ●   |     |     |
| 3rd  | ●   |     | ●   |     |     |     |     |
| 4th  | ●   |     |     | ●   |     |     |     |
| 5th  | ●   | ●   |     |     |     |     |     |
| 6th  |     | ●   |     | ●   |     |     |     |
| 7th  |     | ●   | ●   |     |     |     |     |
| 8th  |     | ●   |     |     | ●   |     |     |
| Rev1 |     |     | ●   |     |     | ●   |     |
| Rev2 |     |     |     | ●   |     | ●   |     |

(●): INDICATES THAT ENGINE BRAKE IS APPLIED.

FIG. 12A

8th      VEHICLE SPEED

| | | 0-30 | 30-60 | 60-90 | 90-120 | 120- |
|---|---|---|---|---|---|---|
| SMALL | DECELERATION | 3 | 2 | 2 | 1 | 1 |
| | | 4 | 3 | 2 | 2 | 1 |
| | | 5 | 4 | 3 | 2 | 1 |
| LARGE | | 6 | 5 | 4 | 3 | 1 |

FIG. 12B

7th      VEHICLE SPEED

| | | 0-30 | 30-60 | 60-90 | 90-120 | 120- |
|---|---|---|---|---|---|---|
| SMALL | DECELERATION | 2 | 1 | 1 | 1 | 1 |
| | | 3 | 2 | 1 | 1 | 1 |
| | | 4 | 3 | 2 | 1 | 1 |
| LARGE | | 4 | 4 | 3 | 2 | 1 |

FIG. 12C

6th      VEHICLE SPEED

| | | 0-30 | 30-60 | 60-90 | 90-120 | 120- |
|---|---|---|---|---|---|---|
| SMALL | DECELERATION | 2 | 1 | 1 | 1 | 1 |
| | | 2 | 2 | 1 | 1 | 1 |
| | | 3 | 2 | 2 | 1 | 1 |
| LARGE | | 3 | 3 | 2 | 2 | 1 |

FIG. 12D

5th      VEHICLE SPEED

| | | 0-30 | 30-60 | 60-90 | 90-120 | 120- |
|---|---|---|---|---|---|---|
| SMALL | DECELERATION | 1 | 1 | 1 | 1 | 1 |
| | | 2 | 1 | 1 | 1 | 1 |
| | | 2 | 2 | 1 | 1 | 1 |
| LARGE | | 3 | 2 | 2 | 1 | 1 |

FIG. 12E

4th      VEHICLE SPEED

| | | 0-30 | 30-60 | 60-90 | 90-120 | 120- |
|---|---|---|---|---|---|---|
| SMALL | DECELERATION | 1 | 1 | 1 | 1 | 1 |
| | | 1 | 1 | 1 | 1 | 1 |
| | | 2 | 1 | 1 | 1 | 1 |
| LARGE | | 2 | 2 | 1 | 1 | 1 |

CONTROL DEVICE FOR AUTOMATIC TRANSMISSION

CROSS-REFERENCE TO RELATED APPLICATION

The disclosure of Japanese Patent Application No. 2007-338147 filed on Dec. 27, 2007 including the specification, drawings and abstract is incorporated herein by reference in its entirety.

BACKGROUND

The present invention relates to a control device and method for an automatic transmission.

An automatic transmission mounted on a vehicle or the like is structured so as to be capable of driving the vehicle at an appropriate gear ratio without a shift operation by a driver, by automatically judging a gear ratio (shift speed) based on an accelerator opening and a vehicle speed particularly during forward driving. However, in recent years, in order to meet such a demand for sports driving and a delicate selection of engine braking for example, automatic transmissions have been proposed that also allow a so-called manual shift operation in which the driver can select a gear ratio (shift speed) (see, for example, Japanese Patent Application Publication No. JP-A-10-324169).

In recent years, since improvements in vehicle fuel consumption and so on are required, multi-speed automatic transmissions, such as those achieving six or more forward speeds, are becoming prevailing in the category of stepped automatic transmissions. Moreover, automatic transmissions such as belt type CVTs that steplessly change speed, are also structured so as to be capable of selecting simulated shift speeds by providing finely spaced gear ratios (for example, 6 stages or more).

SUMMARY

However, in order to obtain a large engine brake force, for example, during downhill driving or hard braking with the automatic transmission provided with the finely spaced (multi-speed) gear ratios (shift speeds) such as described above, it is required to change the gear ratio (shift speed) through, for example, two or three stages. Particularly, in the case of performing the manual shift operation as described above, there has been a problem in that the driver needs to successively perform a manual shift operation a multiple number of times in a short period of time, resulting in a troublesome operation that is not preferable in terms of ease of operation of the vehicle.

Moreover, when performing the manual shift operation as described above, the trouble of the operation is expected to be eased by structuring the automatic transmission so that a command for multiple-speed shift is executed, for example, by a so-called long pressing operation in which a control lever or the like is kept to be pressed in the downshift command position. However, when taking into account the time for the long pressing required for judgment to prevent an erroneous operation from occurring, a long time is required for completing the shift command, resulting in a lack of responsiveness that is particularly unfavorable to sports driving. In addition, because the shift command is increased by one stage for each operation, the shifting of the automatic transmission is performed one stage at a time, that is, for example, in the sequence of 6th, 5th, 4th, and 3rd, resulting in the generation of successive speed shifts, and thus causing a problem that is not preferable in terms of drivability.

Therefore, it is an object of the present invention to provide a control device for an automatic transmission that is capable of quickly downshifting to a gear ratio desired by a driver without involving a troublesome operation when performing an operation based on a downshift command by using a manual operation device. The present invention can also achieve various other advantages.

An exemplary control device for an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the control device includes a manual shift control unit that changes and sets the gear ratio after downshift depending on a degree of requirement for deceleration based on a driving operation when the downshift command has been operated by the manual operation device in the manual shift mode, and performs the downshift to the gear ratio that has been changed and set.

An exemplary method of operating an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the method includes determining whether the downshift command has been operated by the manual operation device in the manual shift mode; changing and setting the gear ratio after downshift depending on a degree of requirement for deceleration based on a driving operation when the downshift command has been operated by the manual operation device in the manual shift mode; and performing the downshift to the gear ratio that has been changed and set.

BRIEF DESCRIPTION OF THE DRAWINGS

Various exemplary aspects of the invention will be described with reference to the drawings, wherein:

FIG. 2 is a skeleton view showing an automatic transmission to which the present invention can be applied;

FIG. 3 is an engagement table of the present automatic transmission;

FIGS. 12A to 12E are deceleration reflecting maps, FIG. 12A being a map used in eighth speed, FIG. 12B being a map used in seventh speed, FIG. 12C being a map used in sixth speed, FIG. 12D being a map used in fifth speed; and FIG. 12E being a map used in fourth speed.

DETAILED DESCRIPTION OF EMBODIMENTS

Figure 1:
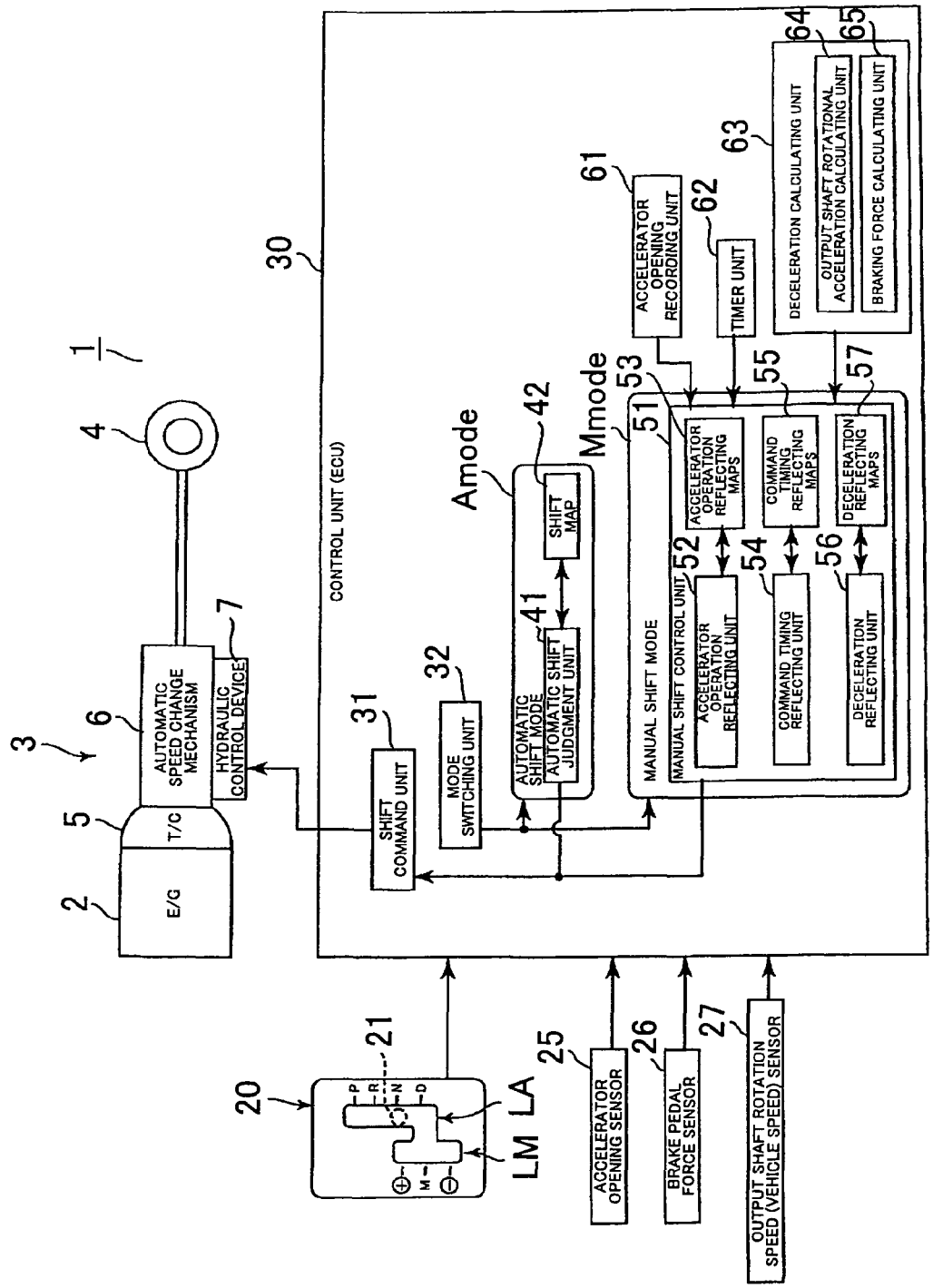
FIG. 1 is a block diagram showing a control device for an automatic transmission according to the present invention.

Hereinafter, an embodiment of the present invention will be described with reference to FIGS. 1 to 13. First, the schematic configuration of an automatic transmission 3 to which the present invention can be applied will be described mainly according to FIG. 2. As shown in FIG. 1, the automatic transmission 3 is provided so as to be interposed between an engine (E/G) 2 and driving wheels 4, and is structured so as to include, in a broad sense, a torque converter (T/C) 5, an automatic speed change mechanism (speed change gear mechanism) 6, and a hydraulic control device 7.

As shown in FIG. 2, the automatic transmission 3 that is suitable for use in, for example, an FF (front engine, front drive) type vehicle has an input shaft 8 that can be connected to the engine 2 (refer to FIG. 1). The torque converter 5 connected to the input shaft 8 has a pump impeller 5b operatively coupled with the input shaft 8, and a turbine runner 5c to which the rotation of the pump impeller 5b is transmitted through hydraulic fluid. The turbine runner 5c is connected to an input shaft 9 of the above-mentioned automatic speed change mechanism 6 that is arranged coaxially with the above-mentioned input shaft 8. In addition, the torque converter 5 is provided with a lockup clutch 5a. When the lockup clutch 5a is engaged by hydraulic control of the hydraulic control device 7 (refer to FIG. 1), the rotation of the input shaft 8 of the above-mentioned automatic transmission 3 is directly transmitted to the input shaft 9 of the automatic speed change mechanism 6.

The above-mentioned automatic speed change mechanism 6 is provided with a planetary gear DP and a planetary gear unit PU on the input shaft 9. The planetary gear DP is a so-called double-pinion planetary gear which is provided with a sun gear S1, a carrier CR1, and a ring gear R1, where the carrier CR1 has, in an intermeshing manner, a pinion P2 that meshes with the sun gear S1 and a pinion P1 that meshes with the ring gear R1.

In addition, the above-mentioned planetary gear unit PU is a so-called Ravigneaux type planetary gear which has a sun gear S2, a sun gear S3, a carrier CR2, and a ring gear R2, where the carrier CR2 has, in an intermeshing manner, a long pinion P3 that meshes with the sun gear S3 and the ring gear R2, and a short pinion P4 that meshes with the sun gear S2.

The sun gear S1 of the above-mentioned planetary gear DP is fixed as a unit to a case 16. In addition, the above-mentioned carrier CR1 is connected to the above-mentioned input shaft 9 so as to make the same rotation as the rotation of the input shaft 9 (hereinafter called "input rotation"), and also connected to a clutch C-4. Moreover, the above-mentioned ring gear R1 makes a decelerated rotation which is decelerated from the input rotation by the fixed sun gear S1 and the carrier CR1 making the input rotation, and is also connected to a clutch C-1 and a clutch C-3.

The sun gear S3 of the above-mentioned planetary gear unit PU can be fixed to the case 16 by being connected to a brake B-1, and is also connected to the above-mentioned clutch C-4 and clutch C-3 to be able to receive the input rotation from the above-mentioned carrier CR1 through the clutch C-4 and the decelerated rotation from the above-mentioned ring gear R1 through the clutch C-3. In addition, the above-mentioned sun gear S2 is connected to the clutch C-1 to be able to receive the decelerated rotation input from the above-mentioned ring gear R1.

Moreover, the above-mentioned carrier CR2 is connected to a clutch C-2 receiving the rotation input from the input shaft 9, to be able to receive the input rotation through the clutch C-2, and also connected to a one-way clutch F-1 and a brake B-2, to be restricted in rotation in one direction relative to the case 16 through the one-way clutch F-1 and to be able to be held stationary through the brake B-2. Furthermore, the above-mentioned ring gear R2 is connected to a counter gear 10 that is rotatably supported by, for example, an unshown center support member fixed to the case 16.

The counter gear 10 meshes with a large diameter gear 11 arranged in a fixed manner at one end of a counter shaft 12 of a counter shaft portion 17, and a small diameter gear 12a arranged in a fixed manner at the other end of the counter shaft 12 meshes with a gear 14 of a differential portion 18. The gear 14 is operatively coupled with a differential gear 13 and is connected to right and left axle shafts (output shafts) 15 and 15, so as to be capable of absorbing the differential rotation between the right and left axle shafts through the differential gear 13.

Subsequently, based on the structure described above, the operation of the automatic transmission 3 will be described according to FIGS. 2 and 3.

For example, at the first forward speed (1st) in the D (drive) range, the clutch C-1 and the one-way clutch F-1 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the rotation of the carrier C2 is restricted to one direction (forward rotating direction); that is, the carrier CR2 is prevented from rotating in the reverse direction so as to be fixed. Then, the decelerated rotation input to the sun gear S2 is output to the ring gear R2 through the fixed carrier CR2, and thus the forward rotation as the first forward speed is output from the counter gear 10.

In addition, during engine braking (coasting), the above-described state of the first forward speed is maintained in the manner in which the brake B-2 is locked to fix the carrier CR2 so that the carrier CR2 is prevented from rotating forward. Moreover, because the carrier CR2 is prevented from rotating in the reverse direction and allowed to rotate forward by the one-way clutch F-1 at the first forward speed, the first forward speed can be achieved smoothly by automatic engagement of the one-way clutch F-1, in the case, for example, of a shift from a non-drive range to a drive range.

At the second forward speed (2nd), the clutch C-1 is engaged and the brake B-1 is locked, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the sun gear S3 is held stationary by the locking of the brake B-1. Then, the carrier CR2 makes a decelerated rotation slower than that of the sun gear S2, and the decelerated rotation input to the sun gear S2 is output to the ring gear R2 through the carrier CR2. Thus, the forward rotation as the second forward speed is output from the counter gear 10.

At the third forward speed (3rd), the clutch C-1 and the clutch C-3 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the decelerated rotation of the ring gear R1 is input to the sun gear S3 by the engagement of the clutch C-3. That is, the decelerated rotation of the ring gear R1 is input to the sun gear S3 and the sun gear S2. Therefore, the planetary gear unit PU takes the state of direct connection of the decelerated rotation to output the decelerated rotation directly to the ring gear R2. Thus, the forward rotation as the third forward speed is output from the counter gear 10.

At the fourth forward speed (4th), the clutch C-1 and the clutch C-4 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the input rotation of the carrier CR1 is input to the sun gear S3 by the engagement of the clutch C-4. Then, the carrier CR2 makes a decelerated rotation faster than that of the sun gear S2, and the decelerated rotation input to the sun gear S2 is output to the ring gear R2 through the carrier CR2. Thus, the forward rotation as the fourth forward speed is output from the counter gear 10.

At the fifth forward speed (5th), the clutch C-1 and the clutch C-2 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the input rotation is input to the carrier CR2 by the engagement of the clutch C-2. Then, a decelerated rotation faster than that of the above-described fourth forward speed is produced by the decelerated rotation input to the sun gear S2 and the input rotation input to the carrier CR2, and is output to the ring gear R2. Thus, the forward rotation as the fifth forward speed is output from the counter gear 10.

At the sixth forward speed (6th), the clutch C-2 and the clutch C-4 are engaged, as shown in FIG. 3. Then, as shown in FIG. 2, the input rotation of the carrier CR1 is input to the sun gear S3 by the engagement of the clutch C-4. In addition, the input rotation is input to the carrier CR2 by the engagement of the clutch C-2. That is, the input rotation is input to the sun gear S3 and the carrier CR2. Therefore, the planetary gear unit PU takes the state of direct connection of the input rotation to output the input rotation directly to the ring gear R2. Thus, the forward rotation as the sixth forward speed is output from the counter gear 10.

At the seventh forward speed (7th), the clutch C-2 and the clutch C-3 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S3 through the clutch C-3. In addition, the input rotation is input to the carrier CR2 by the engagement of the clutch C-2. Then, an accelerated rotation slightly faster than that of the input rotation is produced by the decelerated rotation input to the sun gear S3 and the input rotation input to the carrier CR2, and is output to the ring gear R2. Thus, the forward rotation as the seventh forward speed is output from the counter gear 10.

At the eighth forward speed (8th), the clutch C-2 is engaged and the brake B-1 is locked, as shown in FIG. 3. Then, as shown in FIG. 2, the input rotation is input to the carrier CR2 by the engagement of the clutch C-2. In addition, the sun gear S3 is held stationary by the locking of the brake B-1. Then, the input rotation of the carrier CR2 is made to be an accelerated rotation faster than that of the above-described seventh forward speed by the sun gear S3 held stationary, and is output to the ring gear R2. Thus, the forward rotation as the eighth forward speed is output from the counter gear 10.

At the first reverse speed (Rev1), the clutch C-3 is engaged and the brake B-2 is locked, as shown in FIG. 3. Then, as shown in FIG. 2, the rotation of the ring gear R1 which makes the decelerated rotation provided by the fixed sun gear S1 and the carrier CR1 making the input rotation is input to the sun gear S3 through the clutch C-3. In addition, the carrier CR2 is held stationary by the locking of the brake B-2. Then, the decelerated rotation input to the sun gear S3 is output to the ring gear R2 through the carrier CR2 held stationary, and thus the reverse rotation as the first reverse speed is output from the counter gear 10.

At the second reverse speed (Rev2), the clutch C-4 is engaged and the brake B-2 is locked, as shown in FIG. 3. Then, as shown in FIG. 2, the input rotation of the carrier CR1 is input to the sun gear S3 by the engagement of the clutch C-4. In addition, the carrier CR2 is held stationary by the locking of the brake B-2. Then, the input rotation input to the sun gear S3 is output to the ring gear R2 through the carrier CR2 held stationary, and thus the reverse rotation as the second reverse speed is output from the counter gear 10.

Note that, for example, in the P (parking) range and in the N (neutral) range, the clutches C-1, C-2, C-3, and C-4 are disengaged. Then, disconnection occurs between the carrier CR1 and the sun gear S3, between the ring gear R1 and the sun gear S3, and between the ring gear R1 and the sun gear S2, that is, between the planetary gear DP and the planetary gear unit PU. Also, the input shaft 9 and the carrier CR2 are disconnected from each other. As a result, power transmission is disconnected between the input shaft 9 and the planetary gear unit PU, that is, between the input shaft 9 and the counter gear 10.

Then, the rotation that has been output to the counter gear 10 at a speed of one of the first to eighth forward speeds, and first and second reverse speeds described above is further decelerated by the large diameter gear 11 and the small diameter gear 12a of the counter shaft 12, and is also output to the right and left axle shafts 15 and 15 through the differential gear 13 absorbing the differential rotation between the right and left axle shafts, thus being transmitted to the driving wheels 4.

Subsequently, a control device 1 for the automatic transmission according to the present invention will be described according to FIGS. 1, and 4 to 13.

As shown in FIG. 1, the control device 1 for the present automatic transmission has a control unit (ECU) 30, to which sensors (not shown) of a shift lever unit 20, an accelerator opening sensor 25, a brake pedal force sensor 26, and an output shaft rotation speed (vehicle speed) sensor 27, and others are connected, and which, in turn, is connected to solenoid valves (not shown) of the hydraulic control device 7 for the automatic transmission 3.

The control unit 30 is provided with a shift command unit 31 and a mode switching unit 32, and also provided with an automatic shift judgment unit 41 and a shift map 42 for executing an automatic shift mode Amode, as well as a manual shift control unit 51, an accelerator opening recording unit 61, a timer unit 62, and a deceleration calculating unit 63 for performing a manual shift mode Mmode. The manual shift control unit 51 is structured to include an accelerator operation reflecting unit 52 and accelerator operation reflecting maps 53; a command timing reflecting unit 54 and command timing reflecting maps 55; and a deceleration reflecting unit 56 and deceleration reflecting maps 57. In addition, the deceleration calculating unit 63 is structured to include an output shaft rotational acceleration calculating unit 64 and a braking force calculating unit 65.

The shift lever unit 20 mentioned above is located in the vicinity of a driver's seat, and structured so that the driver can operate a shift lever (a manual operation device) 21 sketchily indicated by a dashed line in the diagram to select the shift lever position. The present shift lever unit 20 is structured so as to be arranged with a range selection lane LA used only for selecting a shift range for use as an automatic transmission, and a manual shift lane LM used by the driver for manually indicating a shift speed. That is, in the range selection lane LA, manipulating the position of the shift lever 21 can select any of position "P" (parking range position), position "R" (reverse range position), position "N" (neutral range position), and position "D" (drive range position), as is commonly known. In addition, the shift lever 21 can be moved from position "D" to the manual shift lane LM, in which the shift lever 21 can be operated to select position "M" (fixed shift position), position "+" (upshift position), or position "−" (downshift position). Each of the positions of the shift lever 21 mentioned above is detected by each sensor (not shown) located in each position, and output to the control unit 30. Note that the shift lever 21 is urged, for example, by a spring, toward position "M" from position "+" or position "−" so as to be automatically returned to position "M" after being operated by the driver.

Note that, in the present embodiment, examples in which the manual shift command is issued by using the shift lever will be described. However, not limited to this case, any device may be used if it can issue the manual shift command. For example, a combination of a button for upshift and a button for downshift provided on a steering wheel, or a combination of a paddle for upshift and a paddle for downshift on the back face of the steering wheel may be used.

In addition, in the description below, examples will be explained in which the shift speed is fixed when the shift position is at "M", as the present embodiment. However, not limited to this case, when the shift position is at "M", the automatic shift may be performed between upper limit shift speeds that have been determined by an upshift command and a downshift command.

In the above-mentioned shift lever unit 20, when the shift lever 21 has been operated to select position "D", the above-mentioned mode switching unit 32 selects the automatic shift mode Amode (switches the mode from the manual shift mode Mmode to the automatic shift mode Amode if the position has been moved from position "M" to position "D"), and in response, the automatic shift judgment unit 41 performs the automatic shift referring to the shift map 42 based on the accelerator opening TH detected by the accelerator opening sensor 25 and on the vehicle speed V detected by the output shaft rotation speed sensor 27. That is, upshift lines and downshift lines (shift points) corresponding to the accelerator opening TH and the vehicle speed V are recorded on the shift map 42. When the accelerator opening TH and the vehicle speed V at the time cross over those shift lines, the automatic shift judgment unit 41 judges to shift speeds. Then, in response to the judgment made by the automatic shift judgment unit 41 to shift speeds, the shift command unit 31 controls the solenoid valve (not shown) of the hydraulic control device 7 by electric command so as to achieve the judged shift speed. This brings the automatic transmission 3 into the state of the judged shift speed.

In the above-mentioned shift lever unit 20, when the shift lever 21 has been operated (switched) to change selection from position "D" to position "M", the above-mentioned mode switching unit 32 selects the manual shift mode Mmode (switches the mode from the automatic shift mode Amode to the manual shift mode Mmode). Then, except in the case, to be described later in detail, of a downshift where the driver intends to decelerate (particularly in the case of a power-on downshift), the manual shift control unit 51 judges to downshift by one stage every time a downshift command is issued by one operation of the shift lever 21 into position "−", and conversely judges to upshift by one stage every time an upshift command is issued by one operation of the shift lever 21 into position "+". After the manual shift control unit 51 has judged to upshift or downshift as described above, the shift command unit 31 controls the solenoid valve (not shown) of the hydraulic control device 7 by electric command so as to achieve the judged shift speed. This brings the automatic transmission 3 into the state of the judged shift speed, in the same manner as described above.

However, based on the accelerator opening TH and the vehicle speed V, if there is a problem about the shift speed to be shifted to, that is, if the shifting is concerned to cause the engine to be over-revved or stalled, the manual shift control unit 51 cancels the shift operation of the shift lever 21 conducted by the driver with, for example, a warning sound for notification at the driver's seat. In addition, as a matter of course, the manual shift control unit 51 cancels an upshift from the above-mentioned eighth forward speed (highest shift speed) and a downshift from the above-mentioned first forward speed (lowest shift speed). Moreover, if it is unfavorable to keep the shift speed unchanged because, for example, the engine may be stalled by a drop of the vehicle speed V without a shift operation of the shift lever 21 by the driver. The manual shift control unit 51 forces shifting to a shift speed that achieves a favorable state, with, for example, a warning sound for notification at the driver's seat.

Subsequently, a description will be made of the manual downshift that takes the degree of driver's intention to decelerate into account. Note that, for ease of understanding of the present invention, the present embodiment is divided into first to third embodiments based on the accelerator operation, command timing, and deceleration, respectively, to be described later in detail.

First Embodiment

Figure 4:
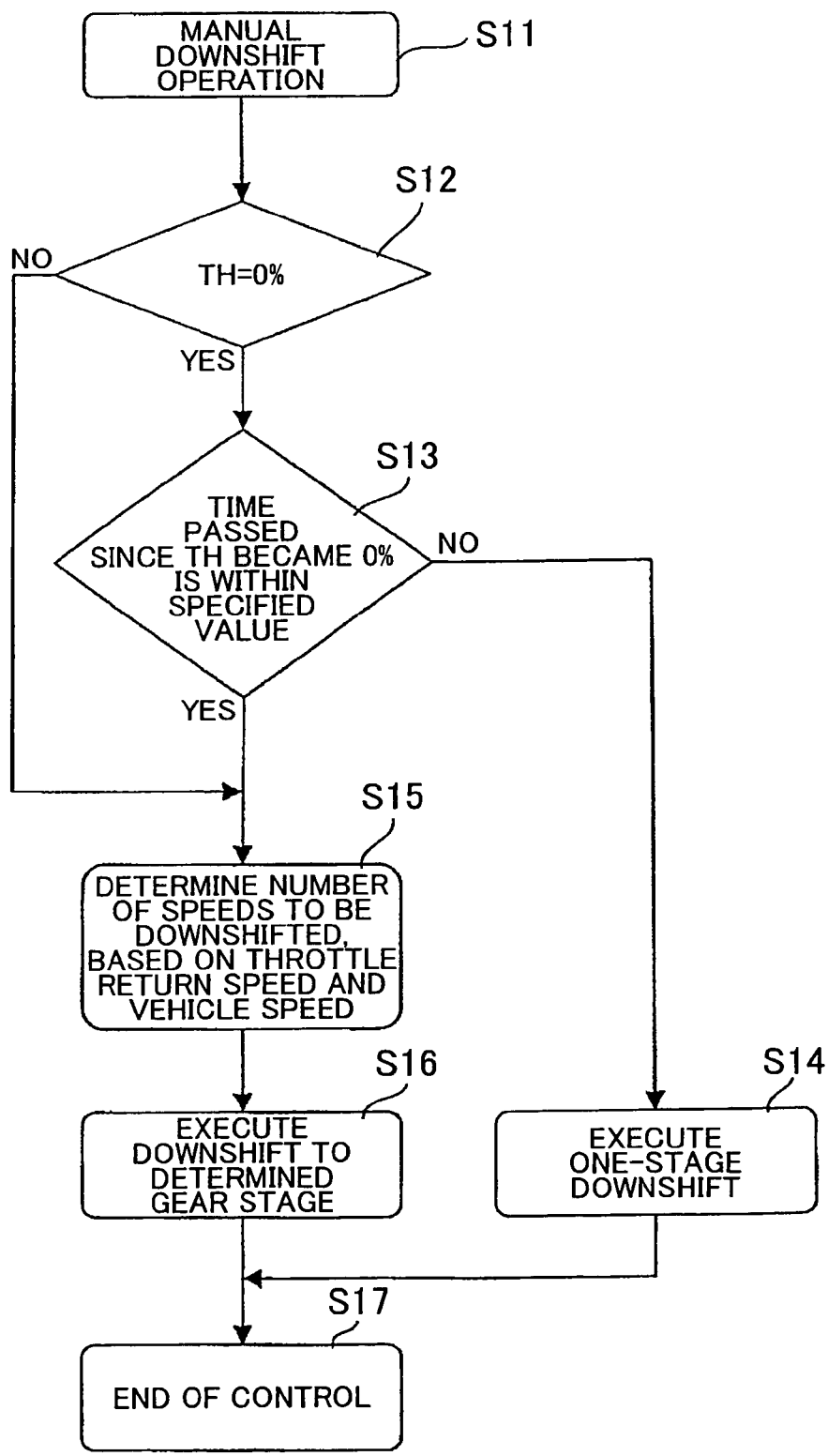
FIG. 4 is a flowchart showing manual downshift control reflecting accelerator operation.
Figure 5A:
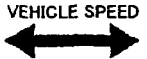
FIGS. 5A to 5E are accelerator operation reflecting maps, FIG. 5A being a map used in eighth speed, FIG. 5B being a map used in seventh speed, FIG. 5C being a map used in sixth speed, FIG. 5D being a map used in fifth speed, and FIG. 5E being a map used in fourth speed.
Figure 5B:
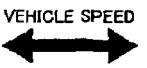
Figure 5C:
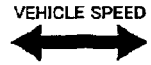
Figure 5D:
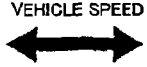
Figure 5E:
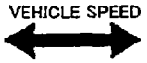

First, a description will be made of a first embodiment that takes into account the accelerator release speed serving as a degree of the driver's intention to decelerate, according to FIGS. 4 to 6, with reference to FIG. 1.

For example, in the state in which an ignition switch is turned on (at least in the state of the manual shift mode Mmode), the accelerator opening recording unit 61 records the accelerator opening TH detected by the accelerator opening sensor 25 in the manner of sampling as needed. In addition, the timer unit 62 measures the time since the accelerator is fully closed.

This control is started when the driver has operated the shift lever 21 from position "D" to position "M" while the vehicle is running. For example, if the driver operates the shift lever 21 from position "M" to position "−" after a while from fully closing the accelerator (after a time has passed longer than a specified value TA to be described later), and a downshift command as a manual shift (hereinafter called "manual downshift") is input to the control unit 30 (S11), the accelerator operation reflecting unit 52 first judges whether the current accelerator opening TH based on the detection by the accelerator opening sensor 25 is 0% or not (that is, whether the accelerator is fully closed or not) (S12), and because the accelerator opening TH in this case is 0% (Yes in S12), the process proceeds to step S13. Then, in the step S13, the accelerator operation reflecting unit 52 judges whether the elapsed time measured by the timer unit 62 from the full closure of the accelerator (for example, from time t2 in FIG. 6A) is within the specified value TA or not, and because the time in this case has passed longer than the specified value TA (for example, because the time is at tend or later in FIG. 6A) (No in S13), the accelerator operation reflecting unit 52 judges to downshift by one stage (S14). Then, the accelerator operation reflecting unit 52 performs the downshift by one stage in the manner of issuing the command from the shift command unit 31 to the hydraulic control device 7, and finishes the control (S17).

That is, in the case that the driver has performed the manual downshift operation after time has passed longer than the specified value TA from fully closing the accelerator as described above, the downshift is performed by one stage in response to one issuance of the downshift command in the same manner as a general automatic transmission, on the judgment that the driver does not particularly intend to apply a large deceleration.

Figure 6A:
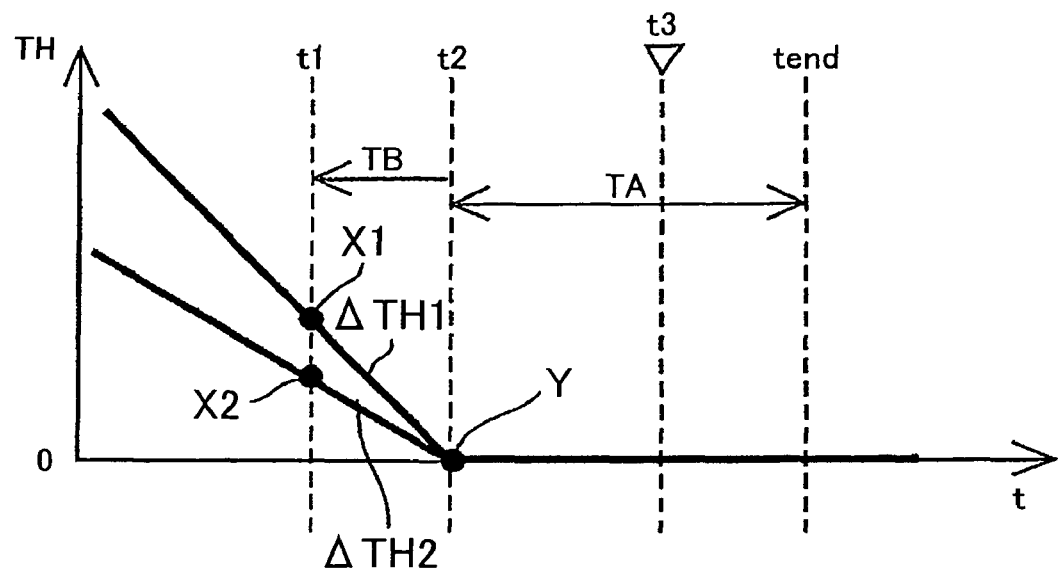
FIGS. 6A and 6B are time charts illustrating the manual downshift control reflecting accelerator operation, FIG. 6A being a chart showing a case in which the downshift is commanded after the accelerator has been fully closed, and FIG. 6B being a chart showing a case in which the downshift is commanded while the accelerator is released.

On the other hand, after the driver has fully closed the accelerator at the time t2, if, for example, the driver performs the manual downshift operation with the shift lever 21 at time t3 (at the time between t2 and tend within the specified value TA) as shown in FIG. 6A, and then the downshift command is sent to the control unit 30 (S11), the process proceeds to the step S13 because the accelerator opening TH is 0% (Yes in S12). Then, the process proceeds to step S15 because the elapsed time measured by the timer unit 62 from the full closure of the accelerator is within the specified value TA (Yes in S13).

Then, the accelerator operation reflecting unit 52 reads, from the accelerator opening recording unit 61, the accelerator opening TH at time t1 earlier by a predetermined time period TB (for example, 0.5 second) than the time t2 when the accelerator has been fully closed, and calculates the accelerator release speed (throttle return speed) ΔTH based on the accelerator opening TH at the time t1 and the accelerator opening TH at the time t2 (that is, 0%). If, for example, the driver has rapidly released the accelerator, the accelerator release speed is represented by ΔTH1 because the accelerator opening TH at the time t1 has a value at point X1, whereas if, for example, the driver has slowly released the accelerator, the accelerator release speed is represented by ΔTH2 that denotes a slower speed than the above-described accelerator release speed ΔTH1 because the accelerator opening TH at the time t1 has a value at point X2.

Subsequently, the accelerator operation reflecting unit 52 refers to the accelerator operation reflecting maps 53 shown in FIGS. 5A to 5E, based on the accelerator release speed ΔTH calculated above and the current vehicle speed V detected by the output shaft rotation speed sensor 27. That is, the accelerator operation reflecting unit 52 refers to: the map shown in FIG. 5A if the current shift speed (before downshift) is the eighth forward speed; the map shown in FIG. 5B if the current shift speed is the seventh forward speed; the map shown in FIG. 5C if the current shift speed is the sixth forward speed; the map shown in FIG. 5D if the current shift speed is the fifth forward speed; or the map shown in FIG. 5E if the current shift speed is the fourth forward speed. Note that, if the current shift speed is the third or lower forward speed, a downshift by two or more stages is unnecessary when considering the difference in gear ratio, and also a downshift by two or more stages is impossible from the second forward speed, as a matter of course. Therefore, maps for the first to third forward speeds are unnecessary as the accelerator operation reflecting maps 53.

The accelerator operation reflecting maps 53 shown in FIGS. 5A to 5E mentioned above are structured so that the number of shift speeds by which one downshift is achieved increases as the vehicle speed V [km/h] becomes lower, and also so that the number of shift speeds by which one downshift is achieved increases as the above-described accelerator release speed ΔTH is quicker. Moreover, the accelerator operation reflecting maps 53 are structured so that the number of shift speeds by which one downshift is achieved increases as the shift speed before downshift is higher.

Then, the accelerator operation reflecting unit 52 determines (changes and sets) the number of speeds to be downshifted by referring to the thus structured accelerator operation reflecting maps 53 (S15), then performs the downshift to the determined shift speed (gear stage) by issuing the command to the shift command unit 31 described above (S16), and finishes the control (S17).

Figure 6B:
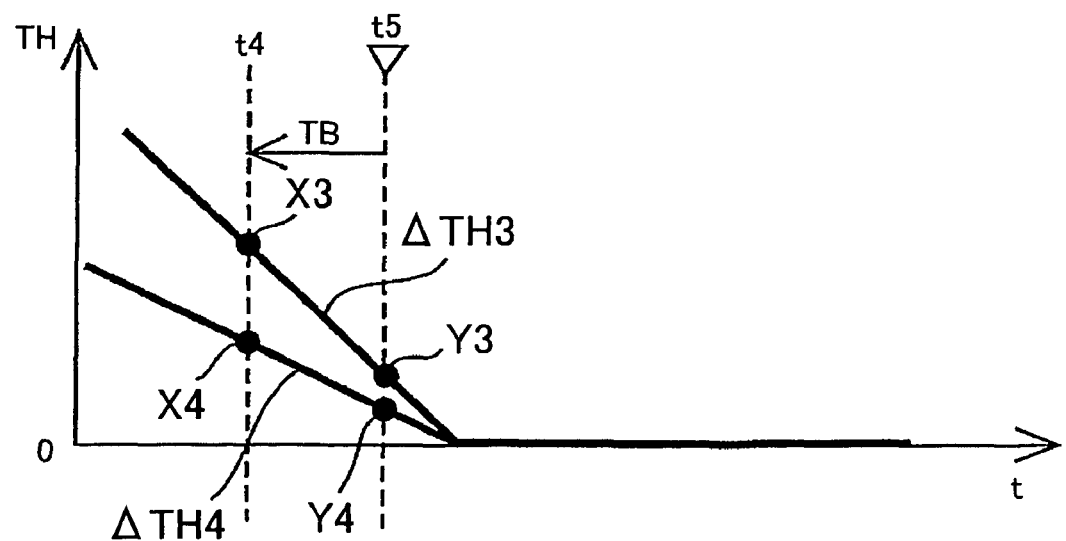

Alternatively, if the driver performs the manual downshift operation with the shift lever 21 at time t5 while closing the accelerator as shown in FIG. 6B, and then the downshift command is sent to the control unit 30 (S11), the process proceeds to the step S15 without executing any processing because the accelerator opening TH is not 0% (No in S12).

In this case, the accelerator operation reflecting unit 52 reads the accelerator opening TH at that time, that is, at the time t5 when the manual downshift operation was performed, and also reads, from the accelerator opening recording unit 61, the accelerator opening TH at the time t4 earlier by the predetermined time period TB (for example, 0.5 second) than the time t5, and calculates the accelerator release speed ΔTH based on the accelerator opening TH at the time t4 and the accelerator opening TH at the time t5. If, for example, the driver has performed the downshift operation while rapidly releasing the accelerator, the accelerator opening TH at the time t4 has a value at point X3 and the accelerator opening TH at the time t5 has a value at point Y3, resulting in the accelerator release speed of ΔTH3. On the other hand, if, for example, the driver has performed the downshift operation while slowly releasing the accelerator, the accelerator opening TH at the time t4 has a value at point X4 and the accelerator opening TH at the time t5 has a value at point Y4, resulting in the accelerator release speed of ΔTH4 that represents a slower speed than the accelerator release speed ΔTH3 described above.

After thus calculating the accelerator release speed ΔTH, the accelerator operation reflecting unit 52 determines (changes and sets) the number of speeds to be downshifted by referring to the accelerator operation reflecting maps 53 shown in FIGS. 5A to 5E based on the accelerator release speed ΔTH calculated above and the current vehicle speed V detected by the output shaft rotation speed sensor 27 (S15). Then, the accelerator operation reflecting unit 52 performs the downshift to the determined shift speed (gear stage) by issuing the command to the shift command unit 31 described above (S16), and finishes the control (S17), in the same manner as described above.

Then, if the driver operates the shift lever 21 from position "M" to position "D", the control described above is terminated, and the mode is changed to the automatic shift mode Amode by the mode switching unit 32 described above, that is, the control for automatic shift is started.

According to the first embodiment as described above, the accelerator operation reflecting unit 52 of the manual shift control unit 51 changes and sets the shift speed after downshift depending on the degree of requirement for deceleration based on the accelerator operation when the downshift command has been operated by the shift lever 21 in the manual shift mode Mmode, and performs the downshift to the shift speed that has been changed and set. Therefore, the downshift depending on the driver's intention to decelerate can be achieved by performing only one operation of the shift lever 21 for issuing the downshift command, and thus the downshift to the gear ratio desired by the driver can be accomplished quickly without involving a troublesome operation.

In addition, because the accelerator operation reflecting unit 52 of the manual shift control unit 51 changes and sets the shift speed after downshift so that the number of shift speed difference between before and after downshift is made larger (that is, so that the gear ratio width is made larger) as the degree of requirement for deceleration is larger, the downshift can be performed so that the engine brake works stronger as the driver's intention to decelerate is greater. This makes it possible to appropriately meet the desire of the driver.

Specifically, the accelerator release speed ΔTH indicating, for example, whether the driver has quickly released the accelerator with the need for rapid deceleration, or slowly released the accelerator without a need for large deceleration can be appropriately reflected in the manual downshift, as a degree of driver's intention to decelerate. In addition, because the accelerator release speed ΔTH is reflected in the shift speed after downshift depending on the vehicle speed V, a required amount of the engine braking force can be appropriately generated depending on the driving conditions. Thus, not only can drivability be improved, but also driving stability can be ensured when performing the manual downshift.

In addition, the accelerator operation reflecting unit 52 calculates the accelerator release speed ΔTH based on the difference in accelerator opening TH between before and after the predetermined time period TB at the accelerator opening TH recorded by the accelerator opening recording unit 61. Therefore, the accelerator release speed ΔTH can be calculated as a mean value during the predetermined time period TB, thereby enabling to obtain the accurate accelerator release speed ΔTH as a degree of driver's intention to decelerate, when compared with a case in which an instantaneous accelerator release speed is detected by using, for example, an acceleration sensor. Accordingly, the degree of driver's intention to decelerate can be appropriately reflected in the downshift by manual operation.

Moreover, because the accelerator operation reflecting maps 53 corresponding to the accelerator release speed ΔTH and the vehicle speed V as described above are provided, the shift speed after downshift can be determined without performing a complex calculation during the manual downshift. This enables a quick manual downshift depending on the driver's intention to decelerate.

Second Embodiment

Figure 7:
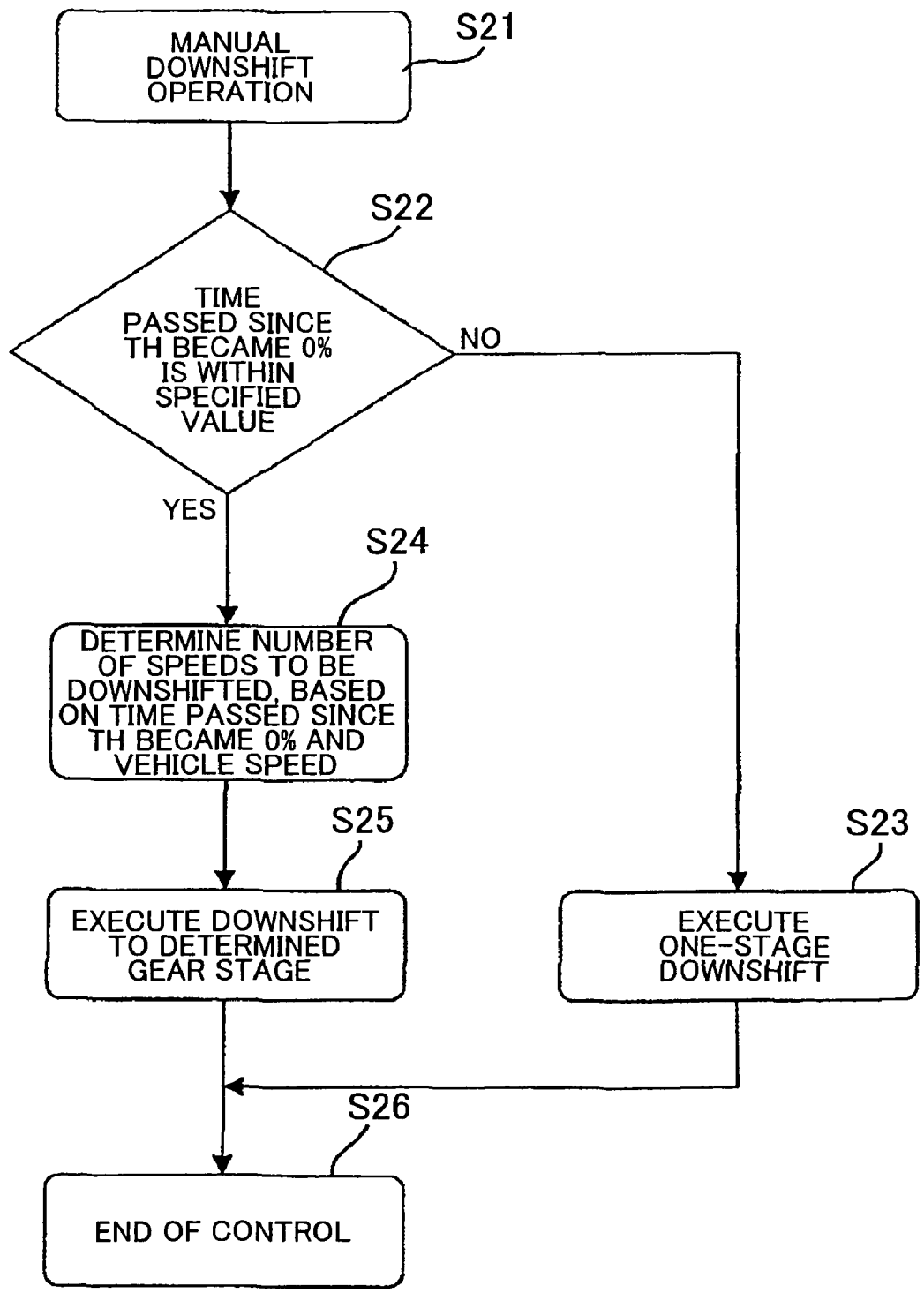
FIG. 7 is a flowchart showing manual downshift control reflecting command timing.
Figure 8A:
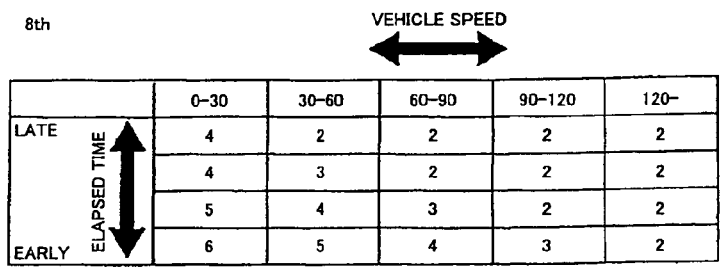
FIGS. 8A to 8E are command timing reflecting maps, FIG. 8A being a map used in eighth speed, FIG. 8B being a map used in seventh speed, FIG. 8C being a map used in sixth speed, FIG. 8D being a map used in fifth speed, and FIG. 8E being a map used in fourth speed.
Figure 8B:
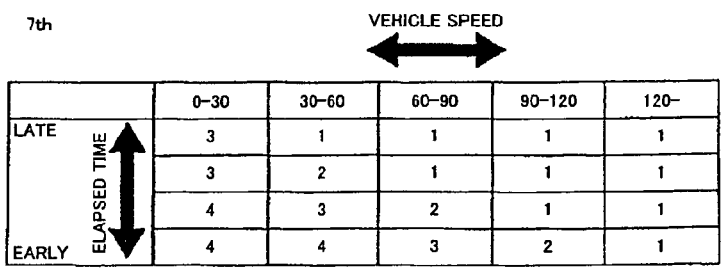
Figure 8C:
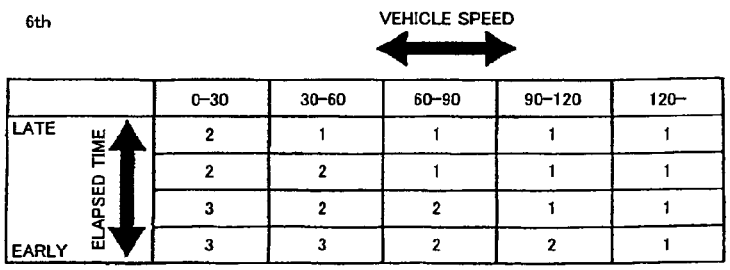
Figure 8D:
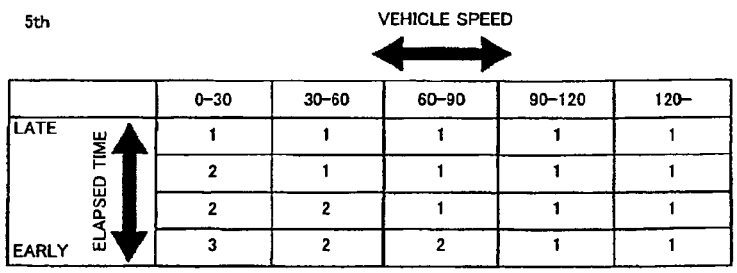
Figure 8E:
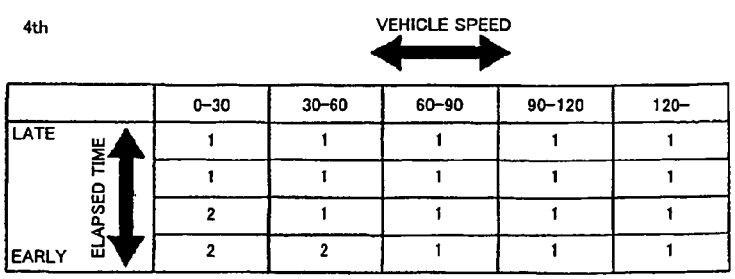

Next, description will be made of a second embodiment that takes into account the elapsed time from the accelerator release operation to the manual downshift operation (that is, the command timing) serving as a degree of the driver's intention to decelerate, according to FIGS. 7 to 9, with reference to FIG. 1.

In the same way as the first embodiment described above, for example, when the driver has operated the shift lever 21 from position "D" to position "M" while the vehicle is running, control according to the second embodiment is started. For example, if the manual downshift operation is performed after a while from the time when the driver has fully closed the accelerator (after time has passed longer than a specified value TA) (S21), the command timing reflecting unit 54 judges whether the elapsed time measured by the timer unit 62 from the full closure of the accelerator (for example, from time t6 in FIG. 9) is within the specified value TA or not, and because the time in this case has passed longer than the specified value TA (for example, the time is at tend or later in FIG. 9) (No in S22), the command timing reflecting unit 54 judges to downshift by one stage (S23). Then, the command timing reflecting unit 54 performs the downshift by one stage in the manner of issuing the command from the shift command unit 31 to the hydraulic control device 7, and finishes the control (S26).

Figure 9:
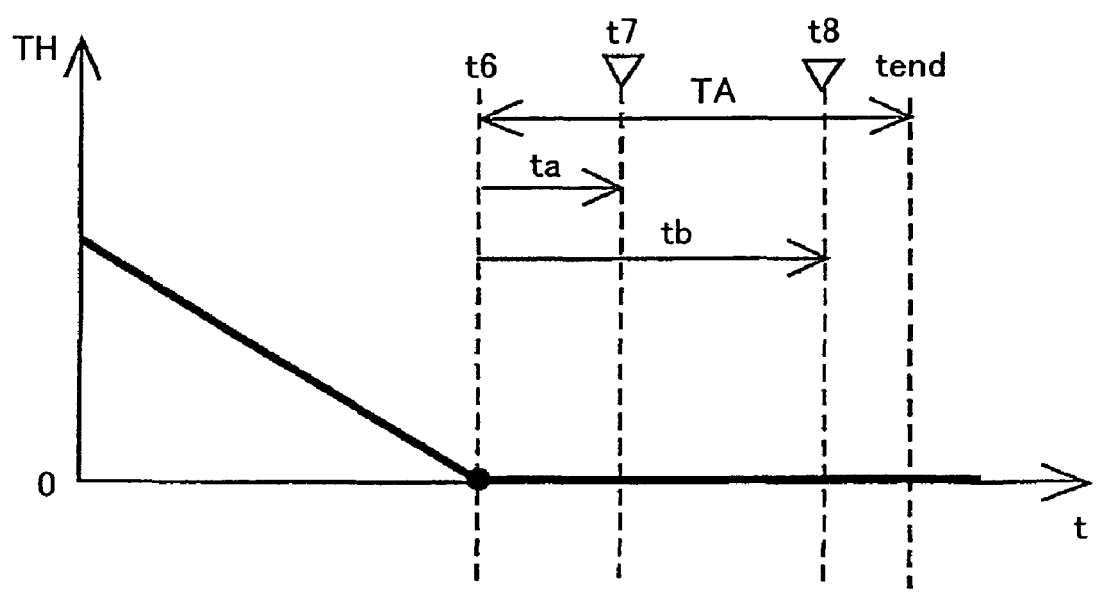
FIG. 9 is a time chart illustrating the manual downshift control reflecting command timing.

On the other hand, after the driver has fully closed the accelerator at the time t6, if the driver performs the manual downshift operation with the shift lever 21 at some time between t6 and tend that has passed within the specified value TA, that is, for example, at time t7 or t8 as shown in FIG. 9, and then the downshift command is sent to the control unit 30 (S21), the process proceeds to step S24 because the elapsed time measured by the timer unit 62 from the full closure of the accelerator is within the specified value TA (Yes in S22).

Then, the command timing reflecting unit 54 assumes, as the elapsed time, the period from the time t6 when the accelerator has been fully closed to the time when the shift lever 21 has been operated to downshift; that is, the command timing reflecting unit 54 assumes the period from the time t6 to the time t7 as elapsed time ta if, for example, the down shift operation is performed at the time t7, or assumes the period from the time t6 to the time t8 as elapsed time tb if, for example, the down shift operation is performed at the time t8.

Subsequently, the command timing reflecting unit 54 refers to the command timing reflecting maps 55 shown in FIGS. 8A to 8E, based on the elapsed time (for example, ta or tb) described above and the current vehicle speed V detected by the output shaft rotation speed sensor 27. That is, the command timing reflecting unit 54 refers to: the map shown in FIG. 8A if the current shift speed (before downshift) is the eighth forward speed; the map shown in FIG. 8B if the current shift speed is the seventh forward speed; the map shown in FIG. 8C if the current shift speed is the sixth forward speed; the map shown in FIG. 8D if the current shift speed is the fifth forward speed; or the map shown in FIG. 8E if the current shift speed is the fourth forward speed. Note that, similarly to the first embodiment described above, if the current shift speed is the third or lower forward speed, a downshift by two or more stages is unnecessary when considering the difference in gear ratio, and also a downshift by two or more stages is impossible from the second forward speed, as a matter of course. Therefore, maps for the first to third forward speeds are unnecessary as the command timing reflecting maps 55.

The command timing reflecting maps 55 shown in FIGS. 8A to 8E mentioned above are structured so that the number of shift speeds by which one downshift is achieved increases as the vehicle speed V [km/h] becomes lower, and also so that the number of shift speeds by which one downshift is achieved increases as the elapsed time described above is shorter (the command timing is earlier). Moreover, the command timing reflecting maps 55 are structured so that the number of shift speeds by which one downshift is achieved increases as the shift speed before downshift is higher.

Then, the command timing reflecting unit 54 determines (changes and sets) the number of speeds to be downshifted by referring to the thus structured command timing reflecting maps 55 (S24), then performs the downshift to the determined shift speed (gear stage) by issuing the command to the shift command unit 31 described above (S25), and finishes the control (S26). Note that, if the driver operates the shift lever 21 from position "M" to position "D", the control described above is terminated.

According to the second embodiment as described above, the command timing reflecting unit 54 of the manual shift control unit 51 changes and sets the shift speed after downshift depending on the degree of requirement for deceleration based on the accelerator operation when the downshift command has been operated by the shift lever 21 in the manual shift mode Mmode, and performs the downshift to the shift speed that has been changed and set. Therefore, the downshift depending on the driver's intention to decelerate can be achieved by performing only one operation of the shift lever 21 for issuing the downshift command, and thus the downshift to the gear ratio desired by the driver can be accomplished quickly without involving a troublesome operation.

In addition, because the command timing reflecting unit 54 of the manual shift control unit 51 changes and sets the shift speed after downshift so that the number of shift speed difference between before and after downshift is made larger as the degree of requirement for deceleration is larger, the downshift can be performed so that the engine brake works stronger as the driver's intention to decelerate is greater. This makes it possible to appropriately meet the desire of the driver.

Specifically, the driver's intention to decelerate can be appropriately reflected in the downshift by manual operation based on the elapsed time indicating, for example, whether the driver has performed the downshift command operation immediately after the accelerator full closing operation with the need for rapid deceleration, or performed the downshift command operation slowly after the accelerator full closing operation without a need for large deceleration. In addition, because the intention to decelerate based on the command timing is reflected in the shift speed after downshift depending on the vehicle speed, a required amount of the engine braking force can be appropriately generated. Thus, not only drivability can be improved, but also driving stability can be ensured when performing the manual downshift.

In addition, because the command timing reflecting unit 54 assumes the length of time from the accelerator full closing operation to the downshift command operation as the elapsed time, the accelerator full closing operation can be assumed as a state in which the driver intends to decelerate, and the length of the time of the state can be assumed to be the degree of the intention to decelerate. Accordingly, the degree of driver's intention to decelerate can be appropriately reflected in the manual downshift.

Moreover, because the command timing reflecting maps 55 corresponding to the elapsed time and the vehicle speed V as described above are provided, the shift speed after downshift can be determined without performing a complex calculation during the manual downshift. This enables a quick manual downshift depending on the driver's intention to decelerate.

Note that the second embodiment assumes the length of time from the accelerator full closing operation to the manual downshift operation to be the elapsed time serving as command timing. However, not limited to this assumption, for example, the length of time since the accelerator release speed has reached a predetermined speed or higher until the manual downshift operation is performed may be assumed as the elapsed time. With this structure, it is similarly made possible to downshift to the shift speed reflecting the degree of driver's intention to decelerate, even if the downshift is performed while the accelerator is rapidly released.

Combined Example of First and Second Embodiments

Next, description will be made of an example in which the first embodiment and the second embodiment are combined, that is, an example in which both the accelerator release speed and the command timing are reflected as the degree of the driver's intention to decelerate.

Figure 10A:
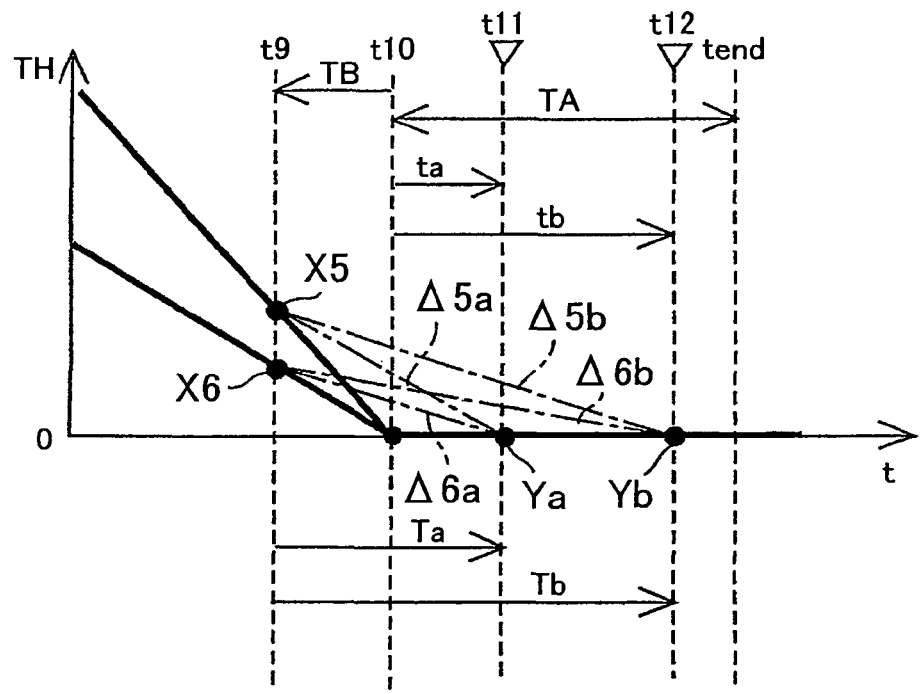
FIGS. 10A and 10B are time charts illustrating the manual downshift control reflecting accelerator release speed and command timing, FIG. 10A being a chart showing a method that combines the timing of the downshift command and the accelerator release speed, and FIG. 10B being a chart showing a method in which the accelerator release speed is linearly interpolated based on the command timing.

As shown in FIG. 10A, in the case that the driver has fully closed the accelerator at time t10 and performs the manual downshift at some time between the time t10 and the time tend within the specified value TA, the length of time, for example, from the time t10 to time t11 is assumed as the elapsed time ta if the manual downshift is performed at the time t11, or the length of time, for example, from the time t10 to time t12 is assumed as the elapsed time tb if the manual downshift is performed at the time t12. Then, the accelerator opening TH at time t9 traced back by the predetermined time period TB from the time t10 at which the accelerator was fully closed is read from the accelerator opening recording unit 61, and based on the difference between the accelerator opening TH thus read and the accelerator opening TH when the manual downshift has been operated, a degree of accelerator release speed/command timing (degree of deceleration) is defined.

That is, if, for example, the accelerator has been rapidly released and also the manual downshift operation has been performed at the time t11, the accelerator opening TH at the time t9 has a value at point X5, and the accelerator opening TH at the time t11 has a value at point Ya. Therefore, the value of a degree of accelerator release speed/command timing $\Delta 5a$ is obtained by dividing the difference between the value at the point X6 and the value at the point Ya by the time T$a$. That is, this case corresponds to a case in which the driver has rapidly released the accelerator and also quickly performed the manual downshift operation. Thus, the degree of driver's intention to decelerate is large, resulting in a steep gradient of $\Delta 5a$.

In another case, if, for example, the accelerator has been rapidly released and also the manual downshift operation has been performed at the time t12, the accelerator opening TH at the time t9 has a value at the point X5, and the accelerator opening TH at the time t12 has a value at point Yb. Therefore, the value of a degree of accelerator release speed/command timing $\Delta 5b$ is obtained by dividing the difference between the value at the point X5 and the value at the point Yb by time Th. That is, this case corresponds to a case in which the driver has rapidly released the accelerator and then slowly performed the manual downshift operation. Thus, the degree of driver's intention to decelerate is smaller than that in the case that the driver has quickly performed the manual downshift operation after releasing the accelerator, resulting in a gradient of $\Delta 5b$ smaller than the gradient of $\Delta 5a$.

In still another case, if, for example, the accelerator has been slowly released and also the manual downshift operation has been performed at the time t11, the accelerator opening TH at the time t9 has a value at the point X6, and the accelerator opening TH at the time t11 has a value at the point Ya. Therefore, the value of a degree of accelerator release speed/command timing $\Delta 6a$ is obtained by dividing the difference between the value at the point X6 and the value at the point Ya by the time Ta. That is, this case corresponds to a case in which the driver has slowly released the accelerator and then quickly performed the manual downshift operation. Thus, the degree of driver's intention to decelerate is smaller than that in the case of the rapid release of the accelerator described above, resulting in a gradient of Δ6a smaller than the gradient of Δ5a.

Further, in still another case, if, for example, the accelerator has been slowly released and also the manual downshift operation has been performed at the time t12, the accelerator opening TH at the time t9 has a value at the point X6, and the accelerator opening TH at the time t12 has a value at the point Yb. Therefore, the value of a degree of accelerator release speed/command timing Δ6b is obtained by dividing the difference between the value at the point X6 and the value at the point Yb by the time Tb. That is, this case corresponds to a case in which the driver has slowly released the accelerator and then slowly performed the manual downshift operation. Thus, the degree of driver's intention to decelerate is smaller than that in any of the three cases described above, resulting in a gradient of Δ6b particularly smaller than the gradient of Δ6a.

Then, by preliminarily preparing maps similar to the accelerator operation reflecting maps 53 (refer to FIGS. 5A to 5E) or the command timing reflecting maps 55 (refer to FIGS. 8A to 8E) described above, and by referring to the prepared maps based on the thus calculated gradient and the vehicle speed V, it is made possible to change the number of speeds to be shifted by one manual downshift operation and to downshift to the changed shift speed in the manner of reflecting both the accelerator release speed and the command timing as a degree of driver's intention to decelerate.

Figure 10B:
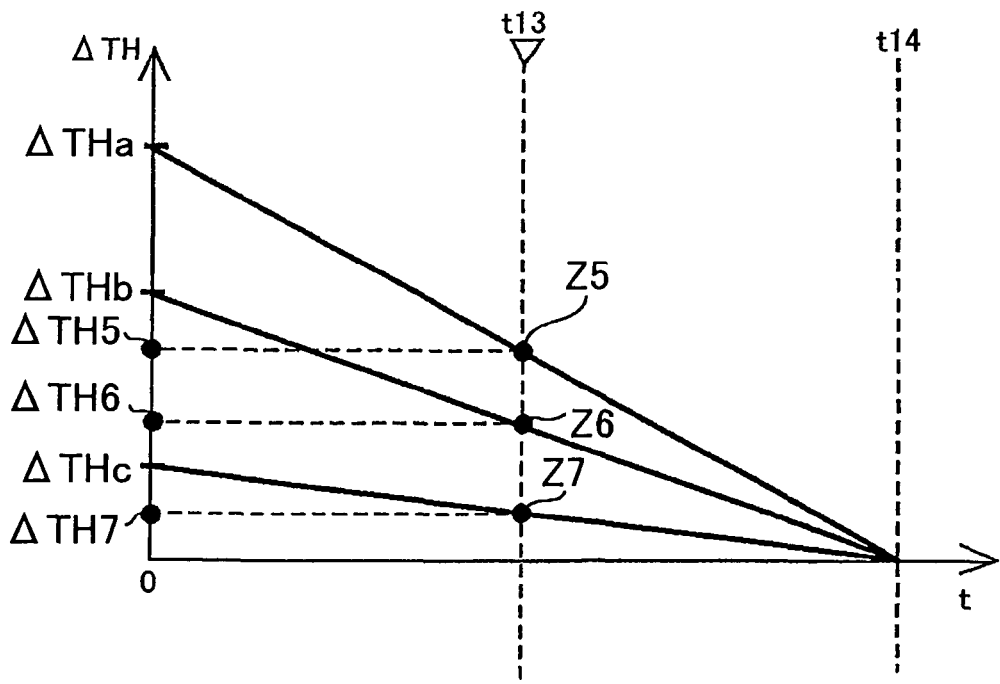

There is also a method as shown in FIG. 10B. That is, the accelerator release speed ΔTH when the accelerator is fully closed (for example, a mean value from 50 ms before the full closure to the full closure) is calculated, and an assumed parameter is set so that the accelerator release speed is assumed to be zero at time t14 coming after a predetermined time period (for example, 2000 ms). Then, if the manual downshift operation has been performed at time t13 after the full closure, the value at the intersecting point of the time t13 and the assumed parameter is assumed to be a degree of accelerator release speed.

That is, if, for example, the accelerator release speed is ΔTHa when the accelerator has been rapidly released to be fully closed, the intersecting point with the assumed parameter is Z5, resulting in a degree of accelerator release speed of ΔTH5. As a matter of course, the value of ΔTH5 is larger if the manual downshift command has been issued before the time t13 (if issued quickly after the full closure). Whereas the value of ΔTH5 is smaller if conversely the manual downshift command has been issued after the time t13 (if issued slowly after the full closure). That is, both the accelerator release speed and the command timing are reflected in the degree of accelerator release speed ΔTH5.

Moreover, if, for example, the accelerator release speed is ΔTHb when the accelerator has been released at a medium speed to be fully closed, the intersecting point with the assumed parameter is Z6, resulting in a degree of accelerator release speed of ΔTH6. In the same way as above, the value of ΔTH6 is larger if the manual downshift command has been issued before the time t13 (if issued quickly after the full closure). Whereas the value of ΔTH6 is smaller if conversely the manual downshift command has been issued after the time t13 (if issued slowly after the full closure). That is, both the accelerator release speed and the command timing are reflected in the degree of accelerator release speed ΔTH6.

Furthermore, if, for example, the accelerator release speed is ΔTHc when the accelerator has been slowly released to be fully closed, the intersecting point with the assumed parameter is Z7, resulting in a degree of accelerator release speed of ΔTH7. In the same way as above, the value of ΔTH7 is larger if the manual downshift command has been issued before the time ti 3 (if issued quickly after the full closure). Whereas the value of ΔTH7 is smaller if conversely the manual downshift command has been issued after the time t13 (if issued slowly after the full closure). That is, both the accelerator release speed and the command timing are reflected in the degree of accelerator release speed ΔTH7.

Then, by preliminarily preparing maps similar to the accelerator operation reflecting maps 53 (refer to FIGS. 5A to 5E) described above, and by referring to the prepared maps based on the thus calculated degree of accelerator release speed ΔTH and the vehicle speed V, it is possible to change the number of speeds to be shifted by one manual downshift operation and to downshift to the changed shift speed in the manner of reflecting both the accelerator release speed and the command timing as a degree of driver's intention to decelerate.

Third Embodiment

Figure 11:
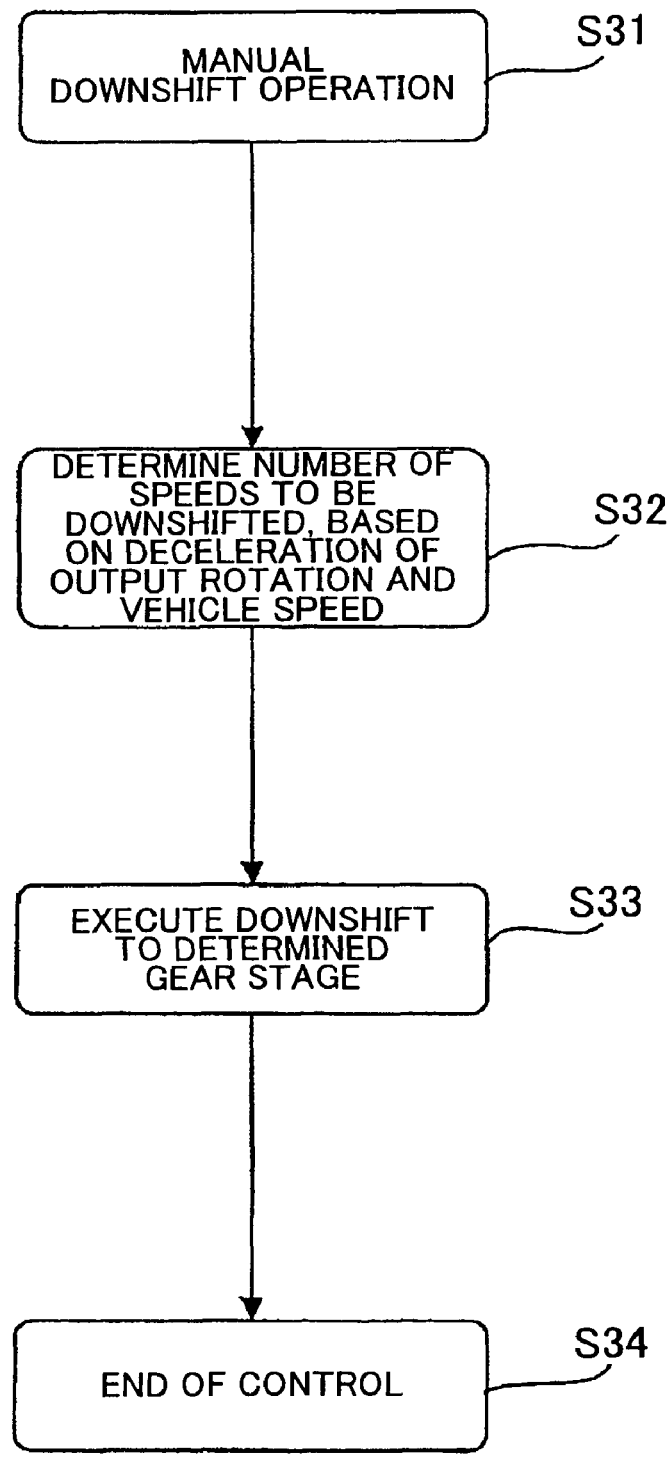
FIG. 11 is a flowchart showing manual downshift control reflecting deceleration.
Figure 13:
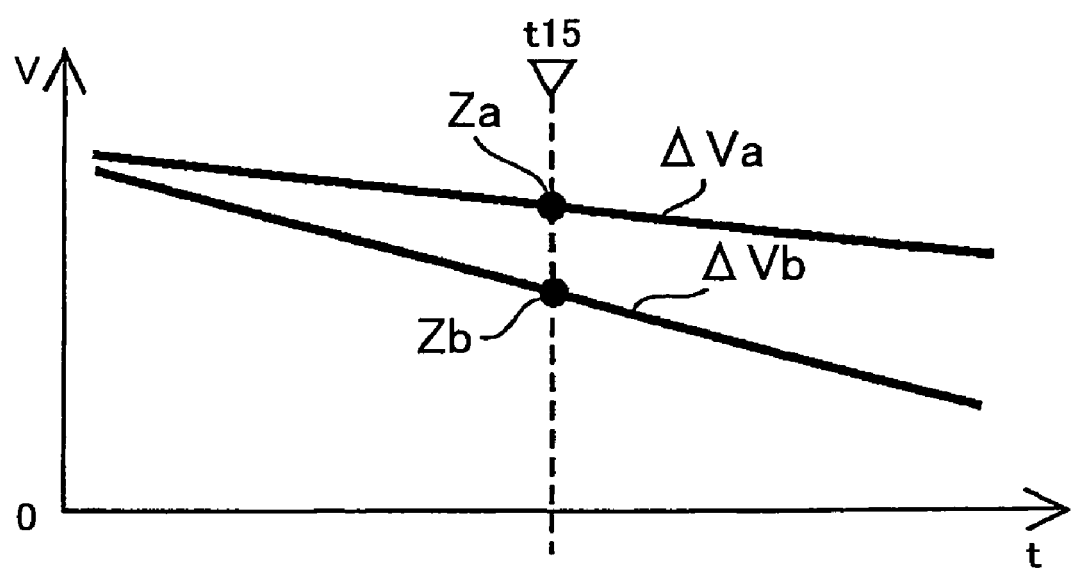
FIG. 13 is a time chart illustrating the manual downshift control reflecting deceleration.

Next, description will be made of a third embodiment that takes into account the vehicle deceleration serving as a degree of the driver's intention to decelerate, according to FIGS. 11 to 13, with reference to FIG. 1.

In the same way as the first and second embodiments described above, for example, when the driver has operated the shift lever 21 from position "D" to position "M", control according to the third embodiment is started. In the third embodiment, the deceleration calculating unit 63 calculates the vehicle deceleration ΔV as needed while the vehicle is running. Specifically, the output shaft rotational acceleration calculating unit 64 calculates a rotational acceleration ΔNout of the output shaft (axle shaft 15) as needed in the manner of differentiating an output shaft rotation speed Nout detected by the output shaft rotation speed sensor 27. For example, as shown in FIG. 13, if the vehicle mildly decelerates and the vehicle speed V mildly decreases, the vehicle deceleration is represented by ΔVa. If, for example, the manual downshift operation is performed at time t15, the vehicle deceleration is obtained as the vehicle deceleration ΔVa at the time t15. Also, needless to say, as shown in FIG. 13, if the vehicle rapidly decelerates and the vehicle speed V rapidly decreases, the vehicle deceleration is represented by ΔVb. If, for example, the manual downshift operation is performed at the time t15, the vehicle deceleration is obtained as the vehicle deceleration ΔVb at the time t15.

Then, if the manual downshift operation is performed while the vehicle is running (S31), the deceleration reflecting unit 56 refers to the deceleration reflecting maps 57 shown in FIGS. 12A to 12E, based on the rotational acceleration of the output shaft calculated by the output shaft rotational acceleration calculating unit 64, that is, the vehicle deceleration ΔV and also based on the vehicle speed V. That is, the deceleration reflecting unit 56 refers to: the map shown in FIG. 12A if the current shift speed (before downshift) is the eighth forward speed; the map shown in FIG. 12B if the current shift speed is the seventh forward speed; the map shown in FIG. 12C if the current shift speed is the sixth forward speed; the map shown in FIG. 12D if the current shift speed is the fifth forward speed; or the map shown in FIG. 12E if the current shift speed is the fourth forward speed. Note that, similarly to the first and second embodiments described above, if the current shift speed is the third or lower forward speed, a downshift by two or more stages is unnecessary when considering the difference in gear ratio, and also a downshift by two or more stages is impossible from the second forward speed, as a matter of course. Therefore, maps for the first to third forward speeds are unnecessary as the deceleration reflecting maps 57.

The deceleration reflecting maps 57 shown in FIGS. 12A to 12E mentioned above are structured so that the number of shift speeds by which one downshift is achieved increases as the vehicle speed V [km/h] becomes lower, and also so that the number of shift speeds by which one downshift is achieved increases as the vehicle deceleration ΔV described above is larger. Moreover, the deceleration reflecting maps 57 are structured so that the number of shift speeds by which one downshift is achieved increases as the shift speed before downshift is higher.

Then, the deceleration reflecting unit 56 determines (changes and sets) the number of speeds to be downshifted by referring to the thus structured deceleration reflecting maps 57 (S32), then performs the downshift to the determined shift speed (gear stage) by issuing the command to the shift command unit 31 described above (S33), and finishes the control (S34). Note that, if the driver operates the shift lever 21 from position "M" to position "D", the control described above is terminated.

Note that the vehicle deceleration ΔV is not only calculated from the rotational acceleration of the output shaft but also capable of taking a braking force of a forced brake into account. That is, it is also possible that the braking force calculating unit 65 calculates the braking force by the service brake, for example, based on a brake pedal force detected by the brake pedal force sensor 26, and then the deceleration calculating unit 63 calculates the vehicle deceleration ΔV by taking the braking force into account.

According to the third embodiment as described above, the deceleration reflecting unit 56 of the manual shift control unit 51 changes and sets the shift speed after downshift depending on the degree of requirement for deceleration based on the accelerator operation when the downshift command has been operated by the shift lever 21 in the manual shift mode Mmode, and performs the downshift to the shift speed that has been changed and set. Therefore, the downshift depending on the driver's intention to decelerate can be achieved by performing only one operation of the shift lever 21 for issuing the downshift command, and thus the downshift to the gear ratio desired by the driver can be accomplished quickly without involving a troublesome operation.

In addition, because the deceleration reflecting unit 56 of the manual shift control unit 51 changes and sets the shift speed after downshift so that the number of shift speed difference between before and after downshift is made larger as the degree of requirement for deceleration is larger, the downshift can be performed so that the engine brake works stronger as the driver's intention to decelerate is greater. This makes it possible to appropriately meet the desire of the driver.

Specifically, the driver's intention to decelerate can be appropriately reflected in the manual downshift, based on the vehicle deceleration indicating, for example, whether the vehicle deceleration is large because of the driver's need for rapid deceleration (leading to a strong pressure on the brake pedal), or the vehicle deceleration is small without a need for large deceleration (hardly leading to a strong pressure on the brake pedal). In addition, because the intention to decelerate based on the vehicle deceleration is reflected in the manual downshift depending on the vehicle speed, a required amount of the engine braking force can be appropriately generated. Thus, not only drivability can be improved, but also driving stability can be ensured when performing the manual downshift.

In addition, because the deceleration reflecting unit 56 assumes, as the vehicle deceleration ΔV, the rotational acceleration of the output shaft at the time when the downshift command is received, the degree of driver's intention to decelerate at the time can be appropriately reflected in the manual downshift.

Moreover, because the deceleration reflecting maps 57 corresponding to the vehicle deceleration ΔV and the vehicle speed V are provided as described above, the shift speed after downshift can be determined without performing a complex calculation during the manual downshift. This enables a quick manual downshift depending on the driver's intention to decelerate.

Note that, in the present embodiments described above, description has been made of the cases in which the control device I is applied to the stepped automatic transmission 3 that can achieve eight forward speeds and two reverse speeds. However, it is needless to say that the present invention is not limited to these applications, but can also be applied to a continuously variable transmission, for example, a belt type CVT. When the continuously variable transmission is downshifted manually, the gear ratio is changed and set, instead of changing and setting the shift speed. In this case, the gear ratio that is changed depending on the degree of driver's intention to decelerate can also be set continuously, for example, in a manner proportional to the degree of intention to decelerate.

Note also that, in the present embodiments, description has been made of the cases in which the respective parameters are used as degrees of driver's intention to decelerate, such as "accelerator release speed" in the first embodiment, "command timing" in the second embodiment, and "deceleration" in the third embodiment. It is also possible, for example, to express these parameters as scores that are then integrally combined to be used as a degree of intention to decelerate. In this case, it is possible to perform the manual downshift reflecting, as a degree of intention to decelerate, all of the accelerator release speed, the command timing and the deceleration. In the case of expressing the degree of intention to decelerate as a score as described above, other parameters (for example, navigation information and following distance from a vehicle ahead) can also be included as a degree of driver's intention to decelerate.

Note moreover that, in the embodiments described above, description has been made of the cases in which, every time a manual downshift command is issued, the number of shift speeds to be downshifted is changed and set, and the downshift is performed to the thus set shift speed. However, if, for example, the driver has successively issued a plurality of manual downshift commands and all of the controls have been executed, the gear ratio may be shifted down to a level lower than the driver intended. Therefore, if the plurality of manual downshift commands are issued in a predetermined time, this control may be canceled and the downshift may be performed by one stage at a time as usual. Alternatively, even if the plurality of manual downshift commands are issued in a predetermined time, only one (only the first one) of the commands may be accepted.

The control device for an automatic transmission according to the present invention can be used in an automatic transmission mounted on a passenger vehicle, truck, bus, agricultural machine, or the like, and is particularly suitable for use in an automatic transmission that is required to allow a quick downshift when a downshift through finely spaced stages of gear ratios is manually commanded.

According to an exemplary aspect of the invention, the manual shift control unit changes and sets the gear ratio after downshift depending on the degree of requirement for deceleration based on the driving operation when the downshift command has been operated by the manual operation device in the manual shift mode, and performs the downshift to the gear ratio that has been changed and set. Therefore, the downshift depending on the driver's intention to decelerate can be achieved by performing only one operation of the manual operation device that issues the downshift command. That is, the downshift to a gear ratio desired by a driver can be accomplished quickly without involving a troublesome operation.

According to an exemplary aspect of the invention, the manual shift control unit changes and sets the gear ratio after downshift so that the gear ratio width between before and after downshift is made larger as the degree of requirement for deceleration is larger. Therefore, the downshift can be performed so that the engine brake works stronger as the driver's intention to decelerate is greater, thereby appropriately meeting the desire of the driver.

According to an exemplary aspect of the invention, the accelerator operation reflecting unit changes and sets the gear ratio after downshift depending on the accelerator release speed and the vehicle speed that serve as the degree of requirement for deceleration. Therefore, the driver's intention to decelerate can be appropriately reflected in the downshift by manual operation, based on the accelerator release speed indicating, for example, whether the driver has quickly released the accelerator with the need for rapid deceleration, or slowly released the accelerator without a need for large deceleration. In addition, because the intention to decelerate based on the accelerator release speed is reflected in the gear ratio after downshift depending on the vehicle speed, a required amount of the engine braking force can be appropriately generated depending on the driving conditions. Thus, not only can drivability be improved, but also driving stability can be ensured when downshifting by manual operation.

According to an exemplary aspect of the invention, the accelerator operation reflecting unit calculates the accelerator release speed based on a difference in accelerator opening between before and after a predetermined time period at the accelerator opening recorded by the accelerator opening recording unit. Therefore, the accelerator release speed can be calculated as a mean value during the predetermined time period, thereby enabling to obtain an accurate accelerator release speed as a degree of driver's intention to decelerate, when compared with a case in which an instantaneous accelerator release speed is detected by using, for example, an acceleration sensor. Accordingly, the degree of driver's intention to decelerate can be appropriately reflected in the downshift by manual operation.

According to an exemplary aspect of the invention, for each gear ratio before downshift, the accelerator operation reflecting map is provided that preliminarily stores the gear ratios after downshift corresponding to the accelerator release speed and the vehicle speed. Therefore, a complex calculation can be made unnecessary during the downshift by manual operation. This enables a quick downshift depending on the driver's intention to decelerate.

According to an exemplary aspect of the invention, the command timing reflecting unit changes and sets the gear ratio after downshift depending on the elapsed time from the accelerator release operation to the downshift command operation and the vehicle speed that serve as the degree of requirement for deceleration. Therefore, the driver's intention to decelerate can be appropriately reflected in the downshift by manual operation, based on the elapsed time indicating, for example, whether the driver has performed the downshift command operation immediately after the accelerator release operation with the need for rapid deceleration, or performed the downshift command operation slowly after the accelerator release operation without a need for large deceleration. In addition, because the intention to decelerate based on the above-described elapsed time is reflected in the gear ratio after downshift depending on the vehicle speed, a required amount of the engine braking force can be appropriately generated. Thus, not only can drivability be improved, but also driving stability can be ensured when downshifting by manual operation.

According to an exemplary aspect of the invention, the command timing reflecting unit assumes the length of time from the accelerator full closing operation to the downshift command operation as the elapsed time. Therefore, the accelerator full closing operation can be assumed as a state in which the driver intends to decelerate, and the length of the time of the state can be assumed to be the degree of the intention to decelerate. Accordingly, the degree of driver's intention to decelerate can be appropriately reflected in the gear ratio after downshift.

According to an exemplary aspect of the invention, for each gear ratio before downshift, the command timing reflecting map is provided that preliminarily stores the gear ratios after downshift corresponding to the elapsed time from the accelerator release operation to the downshift command operation and also corresponding to the vehicle speed. Therefore, complex calculation can be made unnecessary during the downshift by manual operation. This enables a quick downshift depending on the driver's intention to decelerate.

According to an exemplary aspect of the invention, the deceleration reflecting unit changes and sets the gear ratio after downshift depending on the vehicle deceleration and the vehicle speed that serve as the degree of requirement for deceleration. Therefore, the driver's intention to decelerate can be appropriately reflected in the downshift by manual operation, based on the vehicle deceleration indicating, for example, whether the vehicle deceleration is large because of the driver's need for rapid deceleration (leading to a strong pressure on the brake pedal), or the vehicle deceleration is small without a need for large deceleration (leading to no pressure on the brake pedal). In addition, because the intention to decelerate based on the vehicle deceleration is reflected in the gear ratio after downshift depending on the vehicle speed, a required amount of the engine braking force can be appropriately generated. Thus, not only can drivability be improved, but also driving stability can be ensured when downshift is performed by manual operation.

According to an exemplary aspect of the invention, the deceleration reflecting unit assumes, as the vehicle deceleration, the rotational acceleration of the output shaft at the time when the downshift command is received. Therefore, the degree of driver's intention to decelerate at the time can be appropriately reflected in the gear ratio after downshift.

According to an exemplary aspect of the invention, for each gear ratio before downshift, the deceleration reflecting map is provided that preliminarily stores the gear ratios after downshift corresponding to the vehicle deceleration and the vehicle speed. Therefore, a complex calculation can be made unnecessary during the downshift by manual operation. This enables a quick downshift depending on the driver's intention to decelerate.

According to an exemplary aspect of the invention, the automatic transmission is formed by the multi-stage automatic transmission that achieves a plurality of shift speeds by changing the transmission path of the speed change gear mechanism, and the manual shift control unit changes and sets the gear ratio after downshift by changing and setting, depending on the degree of requirement for deceleration, the number of shift speeds to be downshifted by one issuance of the downshift command. Therefore, the downshift to a shift speed depending on the driver's intention to decelerate can be achieved by performing only one operation of the manual operation device that issues the downshift command. That is, the downshift to the shift speed desired by the driver can be accomplished quickly without involving a troublesome operation.

What is claimed is:

1. A control device for an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the control device comprising:
a manual shift control unit that changes and sets a gear ratio after downshift depending on a degree of requirement for deceleration based on a driving operation when the downshift command has been operated by the manual operation device in the manual shift mode, and performs the downshift to the gear ratio that has been changed and set,
wherein the manual shift control unit includes a command timing reflecting unit that changes and sets the gear ratio after the downshift depending on an elapsed time from an accelerator release operation to a downshift command operation and a vehicle speed that serve as the degree of requirement for deceleration.

2. The control device for the automatic transmission according to claim 1, wherein the manual shift control unit changes and sets the gear ratio after the downshift so that a gear ratio width between before and after the downshift is made is larger as the degree of requirement for deceleration is larger.

3. The control device for the automatic transmission according to claim 1, wherein the manual shift control unit includes an accelerator operation reflecting unit that changes and sets the gear ratio after the downshift depending on an accelerator release speed and the vehicle speed that serve as the degree of requirement for deceleration.

4. The control device for the automatic transmission according to claim 3, further comprising:
an accelerator opening recording unit that records an accelerator opening, wherein the accelerator operation reflecting unit calculates the accelerator release speed based on a difference in accelerator opening between before and after a predetermined time period at the accelerator opening recorded by the accelerator opening recording unit.

5. The control device for the automatic transmission according to claim 3, wherein the manual shift control unit stores accelerator operation reflecting maps each of which, for each gear ratio before downshift, preliminarily stores gear ratios after downshift corresponding to the accelerator release speed and the vehicle speed.

6. The control device for the automatic transmission according to claim 1, wherein the command timing reflecting unit assumes a length of time from an accelerator full closing operation to the downshift command operation as the elapsed time.

7. The control device for the automatic transmission according to claim 1, wherein the manual shift control unit stores command timing reflecting maps each of which, for each gear ratio before downshift, preliminarily stores gear ratios after downshift corresponding to the elapsed time from the accelerator release operation to the downshift command operation and also corresponding to the vehicle speed.

8. The control device for the automatic transmission according to claim 1, wherein the manual shift control unit includes a deceleration reflecting unit that changes and sets the gear ratio after the downshift depending on a vehicle deceleration and the vehicle speed that serve as the degree of requirement for deceleration.

9. The control device for the automatic transmission according to claim 8, wherein the deceleration reflecting unit assumes, as the vehicle deceleration, a rotational acceleration of an output shaft at a time when the downshift command is received.

10. The control device for the automatic transmission according to claim 8, wherein the manual shift control unit stores deceleration reflecting maps each of which, for each gear ratio before downshift, preliminarily stores gear ratios after downshift corresponding to the vehicle deceleration and the vehicle speed.

11. The control device for the automatic transmission according to claim 1, wherein:
the automatic transmission is formed by a multi-stage automatic transmission that achieves a plurality of shift speeds by changing a transmission path of a speed change gear mechanism, and
the manual shift control unit changes and sets the gear ratio after downshift by changing and setting, depending on the degree of requirement for deceleration, the number of shift speeds to be downshifted by one issuance of the downshift command.

12. A method of operating an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the method comprising:
determining whether the downshift command has been operated by the manual operation device in the manual shift mode;
changing and setting the gear ratio after downshift depending on a degree of requirement for deceleration based on a driving operation when the downshift command has been operated by the manual operation device in the manual shift mode; and
performing the downshift to the gear ratio that has been changed and set,
wherein the changing and setting of the gear ratio after the downshift depends on an elapsed time from an accelerator release operation to a downshift command operation and a vehicle speed that serve as the degree of requirement for deceleration.

13. The method according to claim 12, wherein the changing and setting of the gear ratio after the downshift is set such that a gear ratio width between before and after the downshift is made is larger as the degree of requirement for deceleration is larger.

14. The method according to claim 12, wherein the changing and setting of the gear ratio after the downshift depends on an accelerator release speed and the vehicle speed that serve as the degree of requirement for deceleration.

15. The method according to claim 14, further comprising:
recording an accelerator opening,
calculating the accelerator release speed based on a difference in accelerator opening between before and after a predetermined time period at the accelerator opening recorded.

16. The method according to claim 12, further comprising:
assuming a length of time from an accelerator full closing operation to the downshift command operation as the elapsed time.

17. The method according to claim 12, wherein the changing and setting of the gear ratio after the downshift depends on a vehicle deceleration and the vehicle speed that serve as the degree of requirement for deceleration.

18. The method according to claim 17, further comprising:
assuming, as the vehicle deceleration, a rotational acceleration of an output shaft at a time when the downshift command is received.

* * * * *